United States Patent Office 3,239,108
Patented Mar. 8, 1966

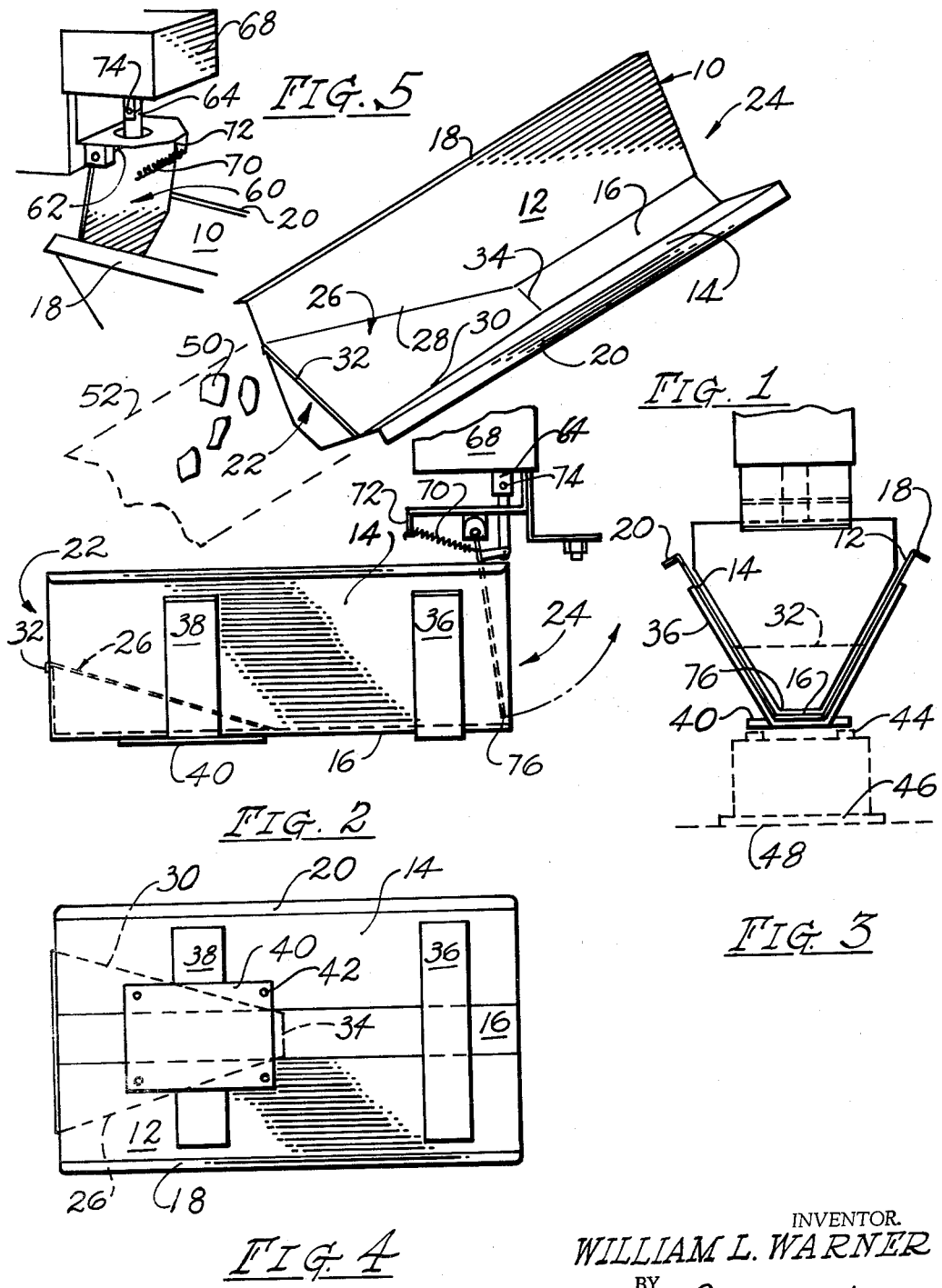

3,239,108
FEEDER PAN AND GATE FOR PACKAGING MACHINES
William L. Warner, Decatur, Ga., assignor to Woodman Company, Inc., Decatur, Ga., a corporation of Georgia
Filed Mar. 24, 1964, Ser. No. 354,358
11 Claims. (Cl. 222—196)

This invention relates to a feeder pan and gate for packaging machines and particularly to a pan which forms part of the conveyor system for directing product such as potato chips from a cooker continuously into the weighing part of a packaging machine, such as a form and fill machine, and to the gate which interrupts the flow momentarily to make proper weight.

The pan of the present invention may be used in conjunction with the packaging machines of the sort shown in the Zwoyer Patent Number 1,986,422 and Woodman Patent Number 2,923,399, and many other packaging machines wherein a loose product such as potato chips is delivered from one source such as a cooked to the ultimate packages and which normally would include separation in the individual batches by weighing or volume. Since this process is rather rapid or high speed the product is moving continuously through the machine and it is necessary to keep the product moving and to separate the product somewhat evenly distributed by the time it reaches the volumetric or weighing apparatus so that the operation is assisted. One problem has been the tendency of the chips to bunch up. Also "holes" in the feed from uneven flow disturb fast accurate weight. In addition, any "doubling-up" or "piggy-back" chips sometimes cause overweights and inaccurate weights due to falling onto the scale after proper weight has been made. The present feeder pan helps reduce the irregular flow and the present gate has improved operation over that found in Patent Number 2,923,399.

Generally described, without restriction on the scope of my invention as defined in the appended claims the present pan is of a novel shape and construction and lends itself to be vibrated by means of a common or conventional electric vibrator which shakes the pan which through the vibration or shaking thereof distributes the product and moves it in a forwardly direction towards its ultimate packaging. The pan is constructed from sheet metal, metal plate brazed or welded together or any other similar fashion to form a substantially main V-shaped body having the sides arranged approximately at 45 degree angles and having an open top approximately four times the width of the flat bottom. The entrance to the pan is provided with a tapered false bottom comprising a tapered plate which is inserted into the entrance of the pan and affixed therein with the width of the false bottom at the entrance end being wider than the width of the edge of the false bottom at the position where the false bottom joins the actual bottom. The false bottom is tapered on the side edges and slopes from the entrance end downwardly to the bottom end and the remainder of the pan is substantially flat and straight to the exit end. Suitable brackets or other members are attached by bracing or welding to the outside surface of the pan and these brackets are provided with bolt openings to receive the bolts for attachment to a conventional electric vibrator which is mounted on the machine frame so that the pan is placed in alignment with the feeder and with the packaging machine. The gate is cut to fit inside the feeder pan and is pivoted so that the gate closes with a downward movement thereby reducing previous gate's tendencies to knock product out of the pan.

An object of this invention is to provide a feeder pan for packaging machines which receives and more evenly spreads potato chips and other product and moves same forward in a more consistent mass to the packaging machine.

A further object of this invention resides in the exact details of shaping construction of the pan whereby a false bottom is provided at the entrance end and the bottom is larger at the entrance than it is at the bottom toward the exit and slopes towards the actual bottom to improve the receipt of the potato chips and the subsequent vibratory transfer thereof.

Another object of this invention resides in the construction whereby a sheetmetal, substantially V-shaped pan forms the main body of the pan and a false bottom member is inserted at the entrance end to complete the details of construction.

Another object of this invention resides in the relationship of parts as to the angle of the sides, the relative slope of the entrance bottom and the straight path of the exit bottom.

Still another object resides in the construction of a gate at the discharge end of the pan which fits the pan inside and offers less chance of trapping a ship against the weighing hopper.

Another feature of the gate is the pivot and position of gate and pivot so that chips are less likely to be swept into the weighing hopper after weight is made.

Other and further advantages of my invention will become apparent upon reading the following specification taken in conjunction with the accompanying drawings, in which:

FIG. 1 is a perspective view looking down into the top of the pan of the present invention.

FIG. 2 is a side elevation view of the pan of FIG. 1 and gate.

FIG. 3 is an end elevation view looking into the exit end toward the gate in FIG. 2.

FIG. 4 is a bottom plan view of the pan shown in FIG. 1.

FIG. 5 is a perspective view of a portion of the gate and actuating mechanism therefor.

Referring initially to the perspective view of the pan 10 shown in FIG. 1, then to the other figures of the drawings as the specification proceeds and unfolds, the pan 10 includes the main body portion which is readily adapted to be bent or fabricated from a piece of stainless steel plate or sheet metal to provide sides 12, 14 sloping at substantially a 45 degree angle with the horizontal towards a narrow straight bottom 16. Sides 12, 14 are bent at their upper edges to form downwardly turned flanges 18, 20.

The entrance end 22 of the pan is the end in which the potato chips or other products are normally fed by dropping 2″ or 3″ from a previous conveyor toward the packaging machine. The exit end is designated by reference numeral 24.

The entrance end 22 has a false bottom therein designated 26 and being constructed from a single flat piece of stainless steel plate or similar material and having tapered sides 28, 30 tapering from the entrance or upper edge 32 which is more than twice as long as the bottom or exit edge 34 which is approximately the same width as the width of the bottom 16. As readily seen in FIG. 2, a typical inclination of the false bottom 26 is approximately 12 degrees to the horizontal assuming that the bottom 16 is in a horizontal position which is not always true but is substantially the position of the bottom 16 when the pan is part of a conveyor system between a source of potato chips such as a cooker and the ultimate packaging machine. Thus, the present pan 10 is a modified V-shape with increased cross-sectional area over either a flat bottom pan or a V-shaped pan.

The outside of sides 12, 14 are provided with heavy metal straps or members 36, 38 welded, brazed or otherwise attached thereto. To the bottom portion of the straps 38, there is attached a mounting plae 40 having bolt openings 42 therein to which is attached the bolts 44 of a typical vibrator which has the bottom 46 thereof mounted on a machine frame 48.

Potato chips or other product 50 conveyed by means of a fabric or other type of conveyor 52 into the front end 22 of pan 10 are usually dropped 2″ or 3″ onto the surface or false bottom 26 near the front edge 32 and are vibrated against each other and forwardly and downwardly toward the exit end 24 thereby separating the chips into a more even continuous delivery and more evenly transferring the chips 50 to the flat substantially straight portion of bottom 16 prior to reaching exit 24. The modified "V-shaped" pan 10 with increased cross-sectional area provides ample product flow to overcome previous disadvantages of insufficient rate. Gaps or holes in the product flow are greatly reduced by the false bottom 26 giving the product additional impetus causing it to move faster with no product ahead to hold it back—thus filling gaps and holes longitudinally, while the converging sides encourage transverse gap or hole filling and the product then moves through the narrow discharge and 24 is a thin, fast, and extremely consistent flow.

Gate 60 is shaped to correspond with the cross-section of pan 10 and actually operates to a closed position inside the pan end 24. The top 62 of gate 60 has a pivot bracket 64 connected to an armature 66 of a solenoid 68. A coil spring 70 has one end connected to the solenoid housing on a lip 72 and the other end to the top 62 of gate 60. Electrical operation of the solenoid 68 causes the pivot bracket 64 to pivot the gate 60 in the direction of the arrow in FIG. 2, which happens the moment the scale hopper (not shown) moves by correct weight of product thereon. The pivot point 74 of bracket 64 is such, with respect to the bottom 76 of gate 60 where it closes inside the end 24 of pan 10, as to cause a downward motion as the gate 60 closes thereby reducing the tendency of gate 60 to knock product into the weigh hopper after weight is made. Also, with gate 60 fitted inside pan 10, a trapped chip is usually held away from the scale hopper so as not to interfere with proper weight as in other arrangements. Gate 60 may be made from soft plastic allowing some flexing even when a product greater than ¼″ is trapped. Also, spring 70 closes gate 60 and solenoid 68 opens it which reduces burning out of solenoids.

While I have shown and described a particular embodiment of my invention together with suggested application thereof, this is by way of illustration only and does not constitute any sort of limitation on the scope of my invention since various alterations, substitutions, changes, deviations, eliminations, ramifications and elucidations may be made in the embodiment shown and described without departing from the scope of my invention as shown in the appended claims.

I claim:
1. In a vibratory feeder pan to be installed and interposed as part of a continuous conveyor system for conveying food products or the like such as potato chips from a source to a packaging machine, and wherein it is desirable to spread and transfer the product as evenly and continuous as possible:
  (a) a feeder pan body having transversely sloped sides arranged substantially on an inclination with the horizontal,
  (b) such sides sloping towards a flat straight bottom extending along the length of said pan,
  (c) and the entrance bottom of said pan having a flat longitudinally sloping and tapering bottom therein extending and sloping along a portion of the length of the pan at an angle to the horizontal not greater than 30° and receiving the product deposited near the upper end thereof and starting to spread the product sufficiently to properly arrange the flow of the product but without sliding too fast down said sloping bottom and comprising a metal plate with tapered side edges, there being one edge attached to and in engagement smoothly with a respective inside side of the pan.

2. The body in claim 1, wherein:
  (a) said sloped edges of said sloping bottom sloping from a top edge to a bottom edge substantially less than half the width and said bottom edge being approximately the same width of and fitted evenly to said bottom of said pan,
  (b) said sloping bottom having the upper edge thereof mounted intermediate the distance between the bottom of the pan and the top edge of the pan and the surface of said sloping bottom sloping forwardly and downwardly toward said real bottom of the pan.

3. The body in claim 2 wherein said sloping bottom slopes at approximately 15 degrees to the horizontal.

4. The body in claim 1, including a gate mounted on the end of said feeder pan, said gate having a configuration corresponding with and a total planar area approximately the same as the internal cross-section of said pan and being pivoted to a position inside said pan end momentarily to interrupt the flow of the product therefrom.

5. The body in claim 4, said gate being pivotally mounted with a solenoid having a gate actuating member actuating said gate when said solenoid is energized, said pivot point being located behind said bottom of said gate bottom edge whereby when closing said gate pivots with a downward motion into the end of said pan to reduce the chance of the gate knocking a chip from the pan.

6. In a feeder pan to be installed and interposed as part of a conveyor means for food products such as potato chips:
  (a) a feeder pan body of a modified V-shaped formation having sloped sides arranged on an inclination so as to incline inwardly from the top to the bottom of the pan,
  (b) said sides sloping from a distance between same that is larger at the top than at the bottom,
  (c) and an entrance to said pan having an inclined, flat longitudinally sloping and tapering bottom that is higher at the entrance end and slopes at an angle not greater than 30° from the horizontal toward the bottom and extending along a portion of the length of the pan, said bottom being flat and straight from said inclined entrance to the exit end of the pan.

7. The pan body in claim 6, wherein:
  (d) the entrance, inclined bottom is inclined to the horizontal at an angle of between 5 degrees and 20 degrees.

8. In a gate that closes the end of a conveyor for potato chips and the like, and wherein said gate is operated to close selectively and to open selectively, in response to a control, and wherein the gate is swung from the top over the end of the pan, the improvement being of:
  (a) The configuration of the gate being the same as and complementary to and approximately the same in area of the cross-section opening through the open pan,
  (b) and the gate being swingable inside the sides of the pan at one end thereof, the outside perimeter of the gate being closely associated with the inside of the pan.

9. The improvement in claim 8, wherein: the support of said gate above said pan is behind the end of the pan so that the gate swings into the bottom of the pan still travelling in a downward direction to reduce the change of knocking chips onto a scale hopper normally located therebelow.

10. The improvement in claim 9, wherein there is a spring means for returning said gate to closed position inside the end of the pan, solenoid actuated means for opening said gate, said solenoid actuated means including a solenoid operated electrically only said gate is temporarily opened, said spring returning same to closed position, thereby reducing the wear and tear on the solenoid.

11. The improvement in claim 8, wherein said gate is made from a plastic-like material which is deformable to some extent thereby allowing some flexing of the gate when closing into the pan.

References Cited by the Examiner

UNITED STATES PATENTS 2,342,116  2/1944  Broekhuysen _____ 198—220
2,446,752  8/1948  Fiddyment _____ 198—56
2,684,148  7/1954  Adams et al. _____ 198—200 X

FOREIGN PATENTS 1,230,293  3/1960  France.

LOUIS J. DEMBO, *Primary Examiner.*

S. H. TOLLBERG, *Assistant Examiner.*